(12) United States Patent
Li et al.

(10) Patent No.: US 7,872,370 B2
(45) Date of Patent: Jan. 18, 2011

(54) PORTABLE ELECTRONIC DEVICE

(75) Inventors: Tsung-Hsien Li, Hsinchu (TW);
Chien-Chiang Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 1197 days.

(21) Appl. No.: 11/501,107

(22) Filed: Aug. 9, 2006

(65) Prior Publication Data

US 2007/0056371 A1 Mar. 15, 2007

(30) Foreign Application Priority Data

Sep. 9, 2005 (TW) ............................. 94131233 A

(51) Int. Cl.
*B60L 3/00* (2006.01)
(52) U.S. Cl. .................................. 307/10.1
(58) Field of Classification Search ............ 307/9.1, 307/10.1; 361/679.34; 340/7.6, 429
See application file for complete search history.

(56) References Cited

U.S. PATENT DOCUMENTS 5,204,991 A * 4/1993 Law ..................... 307/10.7
5,260,684 A * 11/1993 Metzmaker ............ 340/457.1
6,320,351 B1 * 11/2001 Ng et al. .................. 320/104
6,466,134 B1 * 10/2002 Ahearn ..................... 340/683
6,956,467 B1 * 10/2005 Mercado, Jr. ........... 340/426.2
7,680,630 B2 * 3/2010 Schmidt .................. 702/189

FOREIGN PATENT DOCUMENTS

CN 2523648 Y 12/2002

* cited by examiner

*Primary Examiner*—Albert W Paladini

(57) ABSTRACT

A portable electronic device disposed in a car is provided. The portable electronic device includes a power switch, a vibration sensor and a controller. The power switch is used for providing a first power at a first state and providing a second power at a second state. The vibration sensor is used for outputting a vibration signal after sensing the vibration of the car. The vibration sensor is used for terminating the output of vibration signal when not sensing the vibration of the car. The controller is electrically connected to the vibration sensor and the power switch. When the controller receives the vibration signal, the controller controls the power switch to be at the first state and provide the first power. When the controller does not receive the vibration signal, the controller controls the power switch to be at the second state and provide the second power.

18 Claims, 3 Drawing Sheets

PORTABLE ELECTRONIC DEVICE

This application claims the benefit of Taiwan application Serial No. 94131233, filed Sep. 9, 2005, the subject matter of which is incorporated herein by reference.

BACKGROUND OF THE INVENTION

1. Field of the Invention

The invention relates to a portable electronic device, and more particularly to a portable electronic device disposed in a vehicle.

2. Description of the Related Art

With the development of electronic technology, portable electronic devices have become an indispensable appliance to modern people in their everyday life. For example, the electronic device, such as a global positioning system (GPS), applied to a car is used to provide the traffic information for the user.

However, when a GPS electronic device is used in a car, the user may leave the GPS electronic device in the car due to negligence. If the GPS electronic device is left in the car and exposed to the sun for long, the GPS electronic device may be damaged due to the high temperature. Besides, the exposure of the GPS electronic device may attract burglary.

Furthermore, if the user would like to use a GPS electronic device in the car, the user needs to turn the GPS electronic device on after the car is turned on and shut the GPS electronic device down after arriving at the destination. Hence, it is indeed a trouble to the user.

The same problem occurs to other portable electronic devices such as the mobile phone or the personal digital assistant (PDA) as well.

SUMMARY OF THE INVENTION

It is therefore an object of the invention to provide a portable electronic device which is automatically started if the vibration of the car is sensed when the car is turned on and is automatically shut down if the vibration disappears when the car is turned off. The portable electronic device of the present embodiment of the invention does not require the user to start up or shut down the portable electronic device manually, largely increasing the practicality of the portable electronic device. Besides, when the portable electronic device is shut down, the invention uses an indicator to send a sound or emit a light to remind the user of bringing or storing the portable electronic device in a sheltered place before dismounting the car. Therefore, the portable electronic device will not be exposed to the sun or the burglar, largely prolonging the lifespan of the portable electronic device.

The invention achieves the above-identified object by providing a portable electronic device disposed in a car. The portable electronic device includes a power switch, a vibration sensor and a controller. The power switch is used for providing a first power at a first state and providing a second power at a second state. The first power is larger than the second power. The vibration sensor is used for outputting a vibration signal after sensing the vibration of the car. The vibration sensor is used for terminating the output of the vibration signal when not sensing the vibration of the car. The controller is electrically connected to the vibration sensor and the power switch. When the controller receives the vibration signal, the controller controls the power switch to be at the first state and provide the first power. When the controller does not receive the vibration signal, the controller controls the power switch to be at the second state and provide the second power.

The invention further achieves the above-identified object by providing a portable electronic device disposed in a car. The portable electronic device includes a power switch, an indicator, a vibration sensor and a controller. The power switch is used for providing a first power at a first state and providing a second power at a second state. The first power is larger than the second power. The vibration sensor is used for outputting a vibration signal after sensing the vibration of the car when the car is turned on, and for terminating the output of the vibration signal when not sensing the vibration of the car after the car is turned off. The controller electrically connected to the vibration sensor and the indicator is used for turning the portable electronic device on after receiving the vibration signal. The controller is used for turning the portable electronic device off and controlling the indicator to send a sound or a light when not receiving the vibration signal. When the controller receives the vibration signal, the controller controls the power switch to be at the first state and provide the first power. When the controller does not receive the vibration signal, the controller controls the power switch to be at the second state and provide the second power, and the controller controls the indicator to send the sound or the light.

Other objects, features, and advantages of the invention will become apparent from the following detailed description of the preferred but non-limiting embodiments. The following description is made with reference to the accompanying drawings.

DETAILED DESCRIPTION OF THE INVENTION

Throughout this description, the preferred embodiment and examples shown should be considered as exemplars, rather than limitations on the system and method of the present invention.

Figure 1:
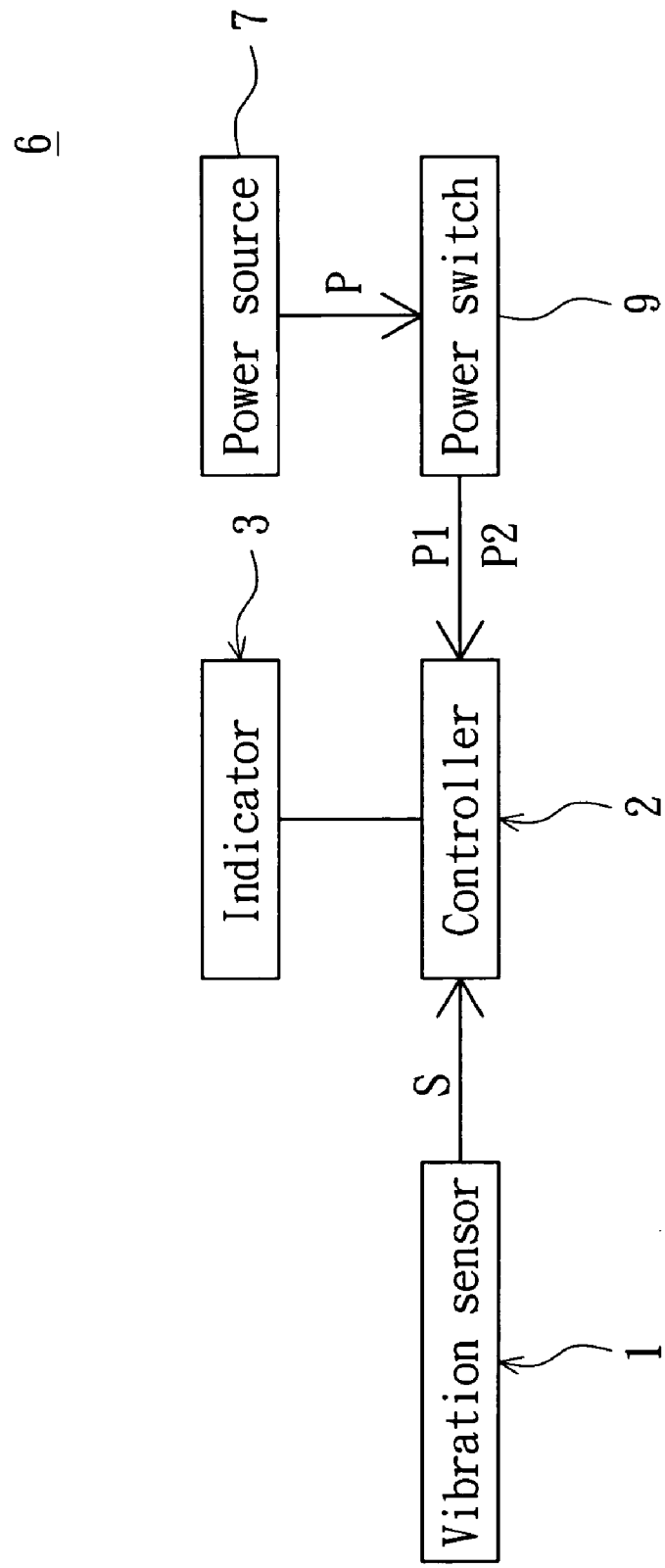
FIG. 1 is a circuit block diagram of a portable electronic device according to a preferred embodiment of the invention.
Figure 2:
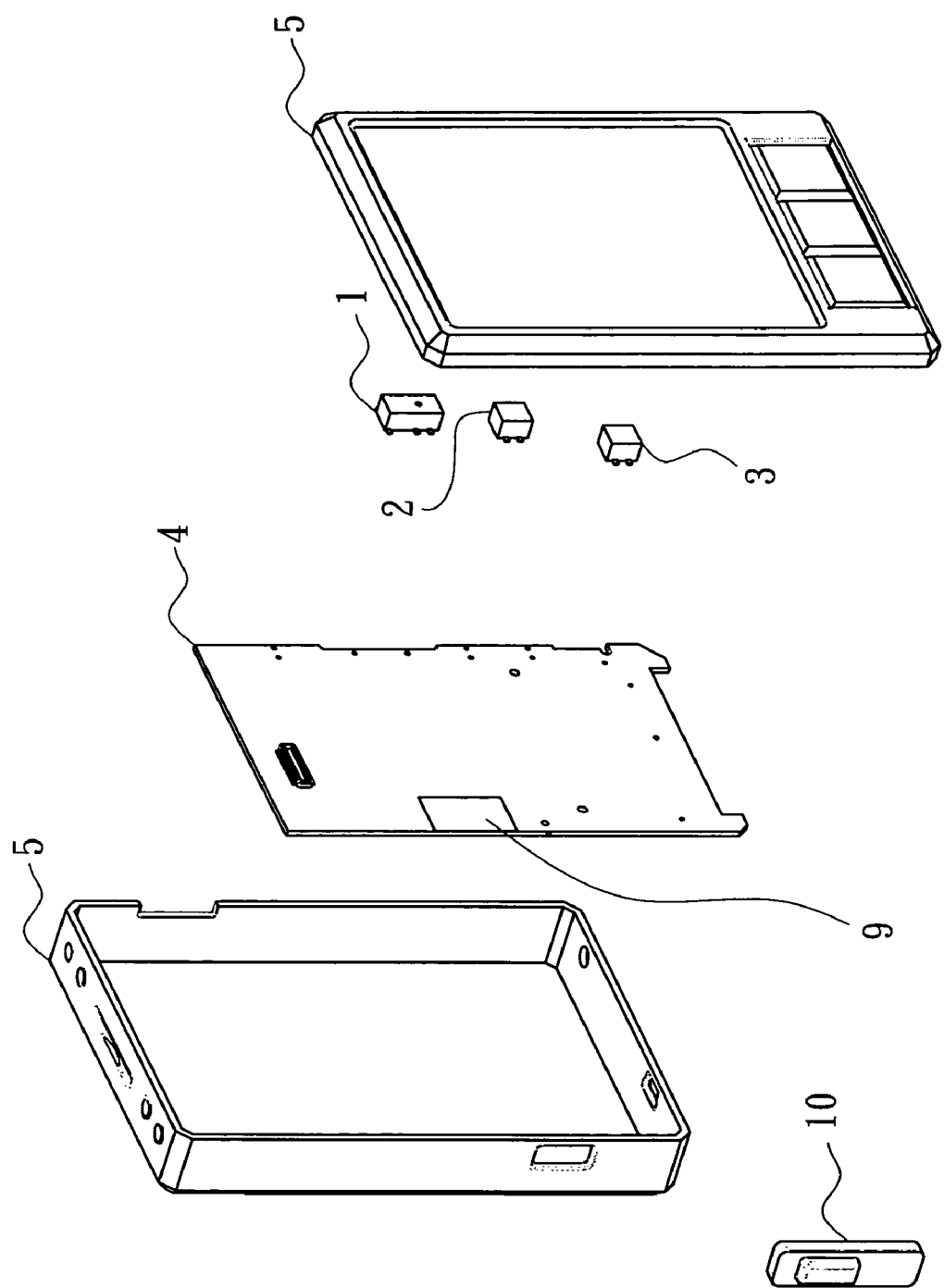
FIG. 2 is an exploded diagram of the portable electronic device according to the preferred embodiment of the invention.
Figure 3:
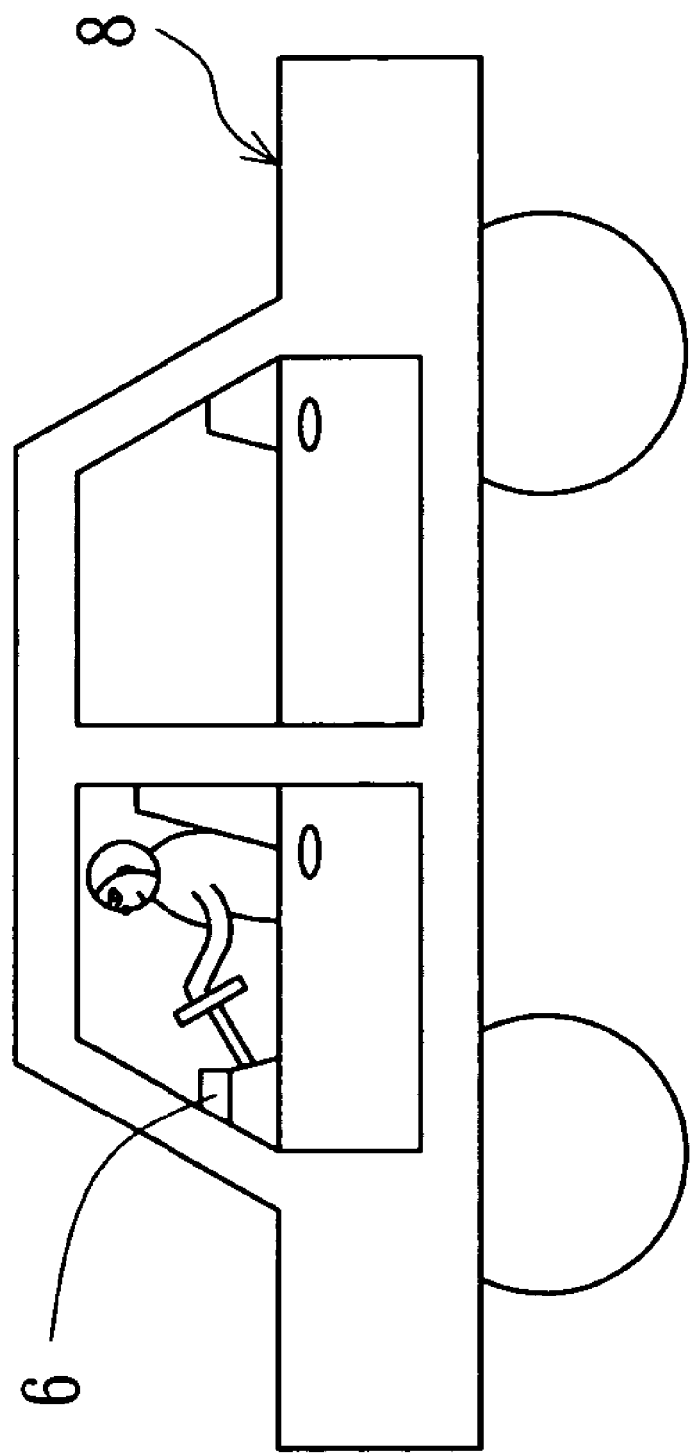
FIG. 3 illustrates the state when the portable electronic device according to the preferred embodiment of the invention is disposed in a car.

Referring to FIGS. 1~3. FIG. 1 is a circuit block diagram of a portable electronic device according to a preferred embodiment of the invention. FIG. 2 is an exploded diagram of the portable electronic device according to the preferred embodiment of the invention. FIG. 3 illustrates the state when the portable electronic device according to the preferred embodiment of the invention is disposed in a car. As shown in FIGS. 1~3, the portable electronic device 6 disposed in a vehicle, such as a car 8. The portable electronic device 6 includes a power switch 9, a vibration sensor 1 and a controller 2.

The power switch 9 is used for providing a first power P1 at a first state and providing a second power P2 at a second state, wherein the first power P1 is larger than the second power P2.

The vibration sensor 1 outputs a vibration signal S when the vibration sensor 1 senses the vibration of the car 8. For example, the car 8 generates a vibration when the car 8 is turned on. Therefore, the vibration sensor 1 outputs a vibration signal S when the vibration sensor 1 senses the vibration of the car 8 and terminates the output of the vibration signal S when the vibration sensor 1 does not sense the vibration of the car 8. For example, when the car 8 is turned off, the car terminates vibrating. Therefore, the vibration sensor 1 terminates the output of the vibration signal S when the vibration sensor 1 does not sense the vibration of the car 8.

The controller 2 is electrically connected to the vibration sensor 1 and the power switch 9, respectively. When the controller 2 receives the vibration signal S from the vibration sensor 1, the controller 2 controls the power switch 9 to be at the first state and provide the first power P1. When the controller 2 does not receive the vibration signal S, the controller 2 controls the power switch 9 to be at the second state and provide the second power P2.

It should be noted that regardless whether the power switch 9 of the portable electronic device 6 is at the first state or the second state, the vibration sensor 1 always keeps sensing the vibration of the car 8 in which the portable electronic device 6 is disposed, and both the controller 2 and the power switch 9 remain in operation. When the power switch 9 is at the second state and provides the second power P2, the controller 2, after receiving the vibration signal S, controls the power switch 9 to be switched to the first state from the second state and provide the first power P1. The above process can be viewed as the automatic start-up process of the portable electronic device 6, and the first power P1 is the power necessary to maintain the operation of the system when the portable electronic device 6 is started up.

When the portable electronic device 6 is at the first state and provides the first power P1, the controller 2, when not receiving the vibration signal S, controls the power switch 9 to be switched to the second state from the first state and provide the second power P2. The above process can be viewed as the automatic shut-down process of the portable electronic device 6, and the second power P2 is the power necessary to maintain the operation of the vibration sensor 1, the controller 2 and the power switch 9 when the portable electronic device 6 is shut down.

Therefore, by turning the car 8 on or off, the user indirectly enables the portable electronic device 6 to be started up or shut down according to whether the car 8 vibrates or not. Hence, the user does not need to manually start up the portable electronic device 6 before driving nor does the user need to manually shut down the portable electronic device 6 before dismounting the car, largely increasing the practicality of the portable electronic device 6.

It should be noted that the vibration sensor 1 generates a corresponding wave-pattern of oscillation when the vibration sensor 1 senses a vibration. Only when the wave-pattern of oscillation complies with the wave-pattern of the vibration of the car 6 sensed by the vibration sensor 1, the vibration sensor 1 outputs a vibration signal S to the controller 2. Generally, the wave pattern of the vibration of the car 6 during driving is small and has small amplitude of vibration, and the vibration usually continues a period of time. Therefore, the vibration sensor 1 can determine whether to output the vibration signal S to the controller 2 according to whether the wave-pattern of vibration is small and has small amplitude of vibration and continues a period of time.

In this embodiment, the portable electronic device 6 further includes an indicator 3 electrically connected to the controller 2. When the controller 2 does not receive the vibration signal S, the controller 2 controls the power switch 9 to be at the second state and provide the second power P2. In addition, the controller 2 controls the indicator 3 to send a sound or emit a light to remind the user of bringing or storing the portable electronic device 6 at a sheltered place before dismounting the car 8. Thus, the portable electronic device 6 will not be exposed to the sun or the burglar, largely prolonging the lifespan of the portable electronic device 6.

In this embodiment, the portable electronic device 6 further includes a housing 5 and a circuit board 4. The circuit board 4 is disposed inside the housing 5. The vibration sensor 1, the power switch 9 and the controller 2 are all disposed on the circuit board 4. In this embodiment, a top casing and a bottom casing of the housing 5 are engaged together to contain the circuit board 4, the controller 2, the power switch 9 and the vibration sensor 1 inside the housing 5. Furthermore, the indicator 3 disposed on circuit board 4 is positioned inside or exposed outside the housing 5. Moreover, the portable electronic device 6 can further include an external power switch 10 for the user to start up or shut down the portable electronic device 6 manually.

The control process of the controller 2 when receiving the vibration signal S is disclosed below. At first, when the controller 2 receives the vibration signal S, the controller 2 determines whether the power switch 9 is at the first state or the second state. If the power switch 9 is at the second state, the controller 2 switches the power switch 9 to the first state. If the power switch 9 is at the first state, the controller 2 continues to maintain the power switch 9 at the first state.

The control process of the controller 2 when not receiving the vibration signal S is disclosed below. When the controller 2 does not receive the vibration signal S, the controller 2 determines whether the power switch 9 is at the first state or the second state. If the power switch 9 is at the first state, the controller 2 switches the power switch 9 to the second state, and the controller 2 controls the indicator 3 to send a sound or emit a light. If the power switch 9 is at the second state, the controller 2 continues to maintain the power switch 9 at the second state.

In this embodiment, when the controller 2 does not receive the vibration signal S, the controller 2 can at the same time switch the power switch 9 to the second state and control the indicator 3 to send a sound or emit a light. In an alternative embodiment, the controller 2 can switch the power switch 9 to the second state first, and then control the indicator 3 to send a sound or emit light. Likewise, the controller 2 can control the indicator 3 to send a sound or a light first, and then switch the power switch 9 to the second state.

As shown in FIG. 1, the portable electronic device 6 further includes a power source 7, which is electrically connected to the power switch 9 for providing a power P to the power switch 9. The power source 7 can be a chargeable battery or an electrical power supply. When the portable electronic device 6 is started up, the portable electronic device 6 can maintain operation by a first power P1. Therefore, the controller 2 controls the power switch 9 to be at the first state and provide the first power P1 to maintain normal operation of the portable electronic device 6.

When the portable electronic device 6 is shut down, the portable electronic device 6 can maintain operation by the second power P2 which is smaller than the first power P1. Therefore, the controller 2 controls the power switch 9 to be at the second state and provide the second power P2 for enabling the vibration sensor 1 to continue sensing the vibration of the car 8 and maintaining the operation of the controller 2 and the power switch 9.

Any one who is skilled in the technology of the preferred embodiment of the present invention will understand that the technology of the present embodiment of the invention is not limited thereto. For example, the indicator 3 can be an amplifier, a speaker, a buzzer, a bulb or a light emitting diode (LED); and the vibration sensor 1 can be an accelerometer, such as a single axial accelerometer or a triple axial accelerometer. Moreover, the controller 2 can be a logic gate, a microprocessor (μP) or an application specific integrated circuit (ASIC); the circuit board 4 can be a flexible printed circuit (FPC) or a printed circuit board (PCB); the portable electronic device 6 can be a mobile phone, a personal digital assistant (PDA), a global positioning system (GPS) electronic device or other pocket portable electronic device. Furthermore, the portable electronic device 6 can further include a display panel for displaying a frame and an antenna module for communication purpose.

According to the portable electronic device disclosed in the above embodiment of the invention, the portable electronic device is started when the vibration sensor senses the vibration of the car being turned on, and the portable electronic device is shut down when the vibration sensor does not sense the vibration of the car which is already turned off. The portable electronic device of the preferred embodiment of the present invention may not require the user to start up or shut down the portable electronic device manually, largely increasing the practicality of the portable electronic device. Of course, in other embodiments, the user may switch to start up or shut down the portable electronic device manually. Besides, when the portable electronic device is shut down, the preferred embodiment of the present invention utilizes an indicator to send a sound or emit a light to remind the user of bringing or storing the portable electronic device in a sheltered place before dismounting the car, so as to avoid the portable electronic device exposing to the sun or the burglar, largely prolonging the lifespan of the portable electronic device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable electronic device disposed in a car, comprising:
   a power switch for providing a first power at a first state and providing a second power at a second state, wherein the first power is larger than the second power;
   a vibration sensor for outputting a vibration signal when sensing the vibration of the car, and terminating the output of the vibration signal when not sensing the vibration of the car; and
   a controller electrically connected to the vibration sensor and the power switch, wherein when the controller receives the vibration signal, the controller controls the power switch to be at the first state and provide the first power, and when the controller does not receive the vibration signal, the controller controls the power switch to be at the second state and provide the second power for enabling the vibration sensor to continue sensing the vibration of the car.

2. The portable electronic device according to claim 1, wherein when the controller receives the vibration signal, the controller determines the power switch to be at the first state or the second state;
   when the controller determines the power switch to be at the second state, the controller switches the power switch to the first state; and
   when the controller determines the power switch to be at the first state, the controller continues to maintain the power switch at the first state.

3. The portable electronic device according to claim 1, wherein when the controller does not receive the vibration signal, the controller determines the power switch to be at the first state or the second state;
   when the controller determines the power switch to be at the first state, the controller switches the power switch to the second state; and
   when the controller determines the power switch to be at the second state, the controller continues to maintain the power switch at the second state.

4. The portable electronic device according to claim 1, further comprising:
   an indicator electrically connected to the controller, wherein the power switch is switched to the second state from the first state, and the controller controls the indicator to send a sound or emit a light.

5. The portable electronic device according to claim 4, wherein the indicator is a buzzer or a light emitting diode (LED).

6. The portable electronic device according to claim 1, further comprising:
   a housing; and
   a circuit board disposed inside the housing, wherein the power switch, the vibration sensor and the controller are all disposed on the circuit board.

7. The portable electronic device according to claim 6, wherein the circuit board comprises a printed circuit board (PCB).

8. The portable electronic device according to claim 1, wherein the vibration sensor comprises an accelerometer.

9. The portable electronic device according to claim 1, wherein the controller comprises a logic gate.

10. The portable electronic device according to claim 1, wherein the portable electronic device is a global positioning system (GPS) electronic device.

11. A portable electronic device disposed in a car, comprising:
    a power switch for providing a first power at a first state and providing a second power at a second state, wherein the first power is larger than the second power;
    an indicator;
    a vibration sensor for outputting a vibration signal after sensing the vibration of the car, and terminating the output of the vibration signal when not sensing the vibration of the car; and
    a controller electrically connected to the vibration sensor, the power switch and the indicator, wherein when the controller receives the vibration signal, the controller controls the power switch to be at the first state and provide the first power, when the controller does not receive the vibration signal, the controller controls the power switch to be at the second state and provide the second power for enabling the vibration sensor to continue sensing the vibration of the car, and the controller controls the indicator to send a sound or emit a light.

12. The portable electronic device according to claim 11, wherein when the controller receives the vibration signal, the controller determines the power switch to be at the first state or the second state;
    when the controller determines the power switch to be at the second state, the controller switches the power switch to the first state; and
    when the controller determines the power switch to be at the first state, the controller continues to maintain the power switch at the first state.

13. The portable electronic device according to claim 11, wherein when the controller does not receive the vibration signal, the controller determines the power switch to be at the first state or the second state;

when the controller determines the power switch to be at the first state, the controller switches the power switch to the second state, and the controller controls the indicator to send the sound or emit the light; and when the controller determines the power switch to be at the second state, the controller continues to maintain the power switch at the second state.

14. The portable electronic device according to claim 11, further comprising:

a housing; and a circuit board disposed inside the housing, wherein the power switch, the vibration sensor, the controller and the indicator are all disposed on the circuit board, and the indicator is positioned inside or exposed outside the housing.

15. The portable electronic device according to claim 14, wherein the circuit board is a printed circuit board.

16. The portable electronic device according to claim 11, wherein the indicator is a buzzer or an LED.

17. The portable electronic device according to claim 11, wherein the vibration sensor is an accelerometer.

18. The portable electronic device according to claim 11, wherein the controller is a logic gate.

* * * * *